United States Patent
Aoki

(10) Patent No.: US 9,357,120 B2
(45) Date of Patent: May 31, 2016

(54) IMAGE CAPTURING APPARATUS AND IN-FOCUS POSITION DETECTION METHOD THEREOF

(71) Applicant: FUJIFILM Corporation, Tokyo (JP)

(72) Inventor: Takashi Aoki, Saitama (JP)

(73) Assignee: FUJIFILM Corporation, Tokyo (JP)

(*) Notice: Subject to any disclaimer, the term of this patent is extended or adjusted under 35 U.S.C. 154(b) by 235 days.

(21) Appl. No.: 13/904,723

(22) Filed: May 29, 2013

(65) Prior Publication Data

US 2013/0250164 A1 Sep. 26, 2013

Related U.S. Application Data

(63) Continuation of application No. PCT/JP2011/076723, filed on Nov. 18, 2011.

(30) Foreign Application Priority Data

Nov. 30, 2010 (JP) ................................. 2010-267934

(51) Int. Cl.
*H04N 5/232* (2006.01)
*G02B 7/34* (2006.01)

(52) U.S. Cl.
CPC .............. *H04N 5/23212* (2013.01); *G02B 7/34* (2013.01); *H04N 5/23219* (2013.01); *H04N 5/23245* (2013.01)

(58) Field of Classification Search
CPC . H04N 5/23212; H04N 5/3696; G03B 13/36; G02B 7/34–7/346
USPC ......... 348/340, 350, 345, 348, 349, 356, 361, 348/222.1; 396/103
See application file for complete search history.

(56) References Cited

U.S. PATENT DOCUMENTS

| 4,914,282 | A | 4/1990 | Akashi et al. | |
|---|---|---|---|---|
| 6,088,537 | A * | 7/2000 | Ohtaka | G02B 7/28 396/81 |
| 2009/0115882 | A1* | 5/2009 | Kawarada | 348/340 |
| 2009/0284641 | A1* | 11/2009 | Hirai | 348/345 |
| 2010/0073527 | A1 | 3/2010 | Ichimiya | |
| 2010/0073549 | A1* | 3/2010 | Sekine | G03B 13/32 348/345 |
| 2010/0238343 | A1* | 9/2010 | Kawarada | H04N 5/23212 348/345 |

(Continued)

FOREIGN PATENT DOCUMENTS

| JP | 61-18912 A | 1/1986 |
|---|---|---|
| JP | 2002-258142 A | 9/2002 |

(Continued)

*Primary Examiner* — Sinh Tran
*Assistant Examiner* — Xi Wang
(74) *Attorney, Agent, or Firm* — Birch, Stewart, Kolasch & Birch, LLP

(57) ABSTRACT

It is provided an image capturing apparatus including a control unit that determines whether to set a division number to a first division number n or to a second division number m which is larger than n based on a setting status of an image capturing apparatus, calculating a divided area evaluation curve by calculating a correlation between first detection information and second detection information for each of divided areas formed by dividing a phase difference detection area into the n or the m, and acquires a defocus amount to drive and control a focus lens to the in-focus position from a total evaluation curve obtained by conducting a required calculation processing on the divided area evaluation curves of the plural divided areas.

4 Claims, 17 Drawing Sheets

(56) References Cited

U.S. PATENT DOCUMENTS

| | | | | |
|---|---|---|---|---|
| 2010/0302432 A1* | 12/2010 | Komuro | ............ | H04N 5/23212 348/340 |
| 2011/0037888 A1* | 2/2011 | Onuki | .................... | G02B 7/346 348/340 |

FOREIGN PATENT DOCUMENTS

| | | |
|---|---|---|
| JP | 2005-156900 A | 6/2005 |
| JP | 2006-178076 A | 7/2006 |
| JP | 2009-8686 A | 1/2009 |
| JP | 2010-8443 A | 1/2010 |
| JP | 2010-20015 A | 1/2010 |
| JP | 2010-32646 A | 2/2010 |
| JP | 2010-78856 A | 4/2010 |
| JP | 2010-91991 A | 4/2010 |
| JP | 2010-93619 A | 4/2010 |
| JP | 2010-152161 A | 7/2010 |
| WO | WO 2010/005105 A1 | 1/2010 |
| WO | WO 2010/010957 A1 | 1/2010 |
| WO | 2010/041721 A1 | 4/2010 |

* cited by examiner

IMAGE CAPTURING APPARATUS AND IN-FOCUS POSITION DETECTION METHOD THEREOF

CROSS REFERENCE TO RELATED APPLICATION

This is a continuation of International Application No. PCT/JP2011/076723 filed on Nov. 18, 2011, and claims priority from Japanese Patent Application No. 2010-267934, filed on Nov. 30, 2010, the entire disclosures of which are incorporated herein by reference.

TECHNICAL FIELD

The present invention relates to an image capturing apparatus configured to detect a distance to a subject and perform a focal position control of a photographing lens and an in-focus position detection method of the image capturing apparatus.

BACKGROUND ART

As for an in-focus position detection method that detects a distance to a main subject, there is a contrast method or a phase difference auto focus ("AF") method. The phase difference AF method is frequently employed in a single lens reflex camera since it is capable of performing the in-focus position detection with high speed and high precision as compared to the contrast method.

A phase difference AF method employed in a conventional single lens reflex camera, for example, as disclosed in Patent Literature 1 below, is provided with two phase difference detection line sensors disposed at the left and the right sides separately from a solid state image capturing element that captures an image of a subject and detect a distance to a main subject based on a phase difference between the detection information of a first line sensor and the detection information of a second line sensor.

The phase difference AF method disclosed in the Patent Literature 1 has problems in that detection line sensors for use in detecting a phase difference are needed separately from a solid state image capturing element and, thus, the component costs and the manufacturing costs are increased, and further the size of the apparatus becomes larger.

Accordingly, as disclosed in Patent Literature 2 below, it has been proposed to install phase difference detection pixels on a light receiving surface of the solid state image capturing element. Since a solid state image capturing element formed with phase difference detection pixels is employed as for a solid state image capturing element that captures an image of a subject, an external phase difference detection sensor becomes unnecessary and cost reduction becomes enabled.

CITATION LIST

Patent Literature

Patent Literature 1: JP-A-2010-8443
Patent Literature 2: JP-A-2010-91991

SUMMARY OF INVENTION

Technical Problem

However, the conventional technology disclosed in Patent Literature 2 is aimed at a single lens reflex camera and premised on the installation of a large-sized solid state image capturing element. The phase difference detection pixels, as disclosed in Patent Literature 2, are configured to detect a phase difference by making the light-shielding film aperture of each of a pair of adjacent pixels small and positioning the light shielding film apertures to be offset towards the phase difference detection direction (generally left and right) in one side and the other side.

A large-sized (large area) solid state image capturing element in which each pixel has a large light receiving area is still capable of obtaining phase difference information with high speed and high precision even if the light shielding film aperture is reduced a little bit. However, in a solid state image capturing element in which the large light receiving area of each pixel is not large, and which is installed in, for example, a compact camera, the original light shielding film apertures are small. Therefore, if the phase difference information is obtained with high speed by setting the light shielding film aperture to be small and the light receiving time to be short, a problem occurs in that the precision of the phase difference information, that is, the precision of in-focus position detection is degraded depending on the status of the subject.

An object of the present invention is to provide an image capturing apparatus capable of calculating an in-focus position by acquiring phase difference information with high speed and high precision regardless of the setting status of a camera even when a solid state image capturing element of a small area is employed, and a method of detecting an in-focus position thereof.

Solution to Problem

An image capturing apparatus and an in-focus position detection method of the present invention is characterized in that the image capturing apparatus comprises: an image capturing element where a pair-pixel configured by a first phase difference detection pixel and a second phase difference detection pixel that are pupil-divided is arranged two-dimensionally in a phase difference detection area provided on a light receiving surface that captures an image of a subject; a focus lens that is disposed at the front end of a light path of the image capturing element and forms an optical image which is in-focus on the subject on the light receiving surface; and a control means that calculates a phase difference between a first distribution curve of first detection information output from the first phase difference detection pixel in relation to one side arrangement direction of the pair-pixel and a second distribution curve of second detection information output from the second phase difference detection pixel in relation to the one side arrangement direction and drives and controls the focus lens to the in-focus position based on the phase difference, in which the in-focus position detection method comprises: determining whether to set a division number into which the phase difference detection area is divided in a direction perpendicular to the detection direction of the phase difference to a first division number n or to a second division number m which is larger than n based on a setting status of the image capturing apparatus, calculating a correlative operation curve for each divided area by calculating a correlation between the first detection information and the second detection information for each of the divided areas formed by dividing the phase difference detection area into the n or the m, and acquiring a defocus amount to drive and control the focus lens to the in-focus position from a total evaluation curve obtained by conducting a required calculation processing on the correlative operation curves of the plural divided areas.

Advantageous Effects of Invention

According to the present invention, even when a small solid state image capturing element is used, an AF operation performance equivalent to that of the single lens reflex camera with high speed and high precision may be obtained regardless of the setting status of a camera as to which subject is targeted to be photographed (for example, whether it is wide angle side photographing or telephoto side photographing, whether it is a night-view mode or not, whether it is still image photographing or moving image photographing, and whether the number of recording pixels is high definition or not).

DESCRIPTION OF EMBODIMENTS

Hereinafter, descriptions of an embodiment of the present invention will be made referring to drawings.

Figure 1:
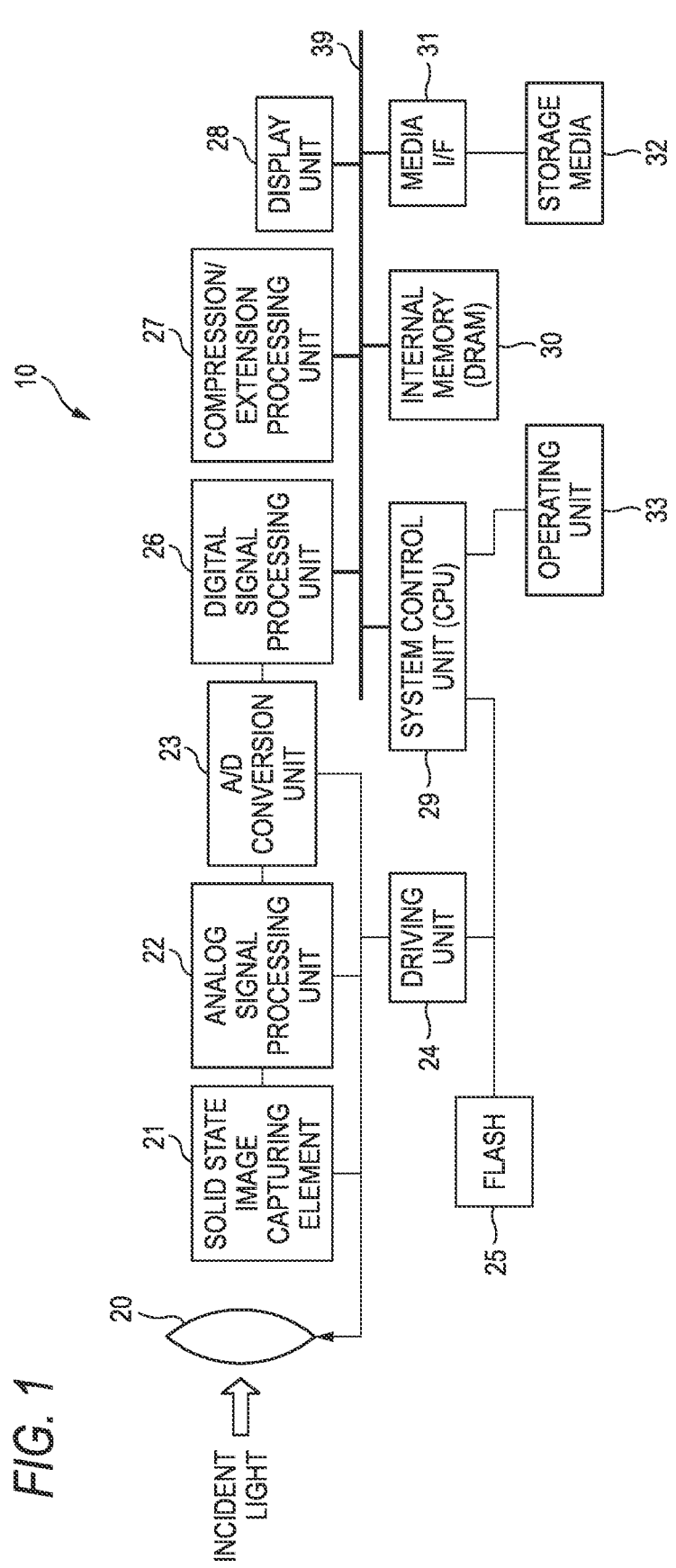
FIG. 1 is a functional block diagram of an image capturing apparatus according to an embodiment of the present invention.

FIG. 1 is a functional block diagram of a digital camera according to an embodiment of the present invention. A digital camera 10 of the present invention photographs a still image or a moving image of a subject and has a function that conducts a digital processing on a captured image signal inside the camera 10, in which the digital camera includes: a photographing lens 20 equipped with a telephoto lens and a focus lens; a solid state image capturing element 21 placed at the back of the photographing lens 20 and disposed on the image forming surface of the photographing lens; an analog signal processing unit 22 that performs an analog processing such as e.g., an automatic gain control ("AGC") or a correlative double sampling processing and the like on an analog image data output from the each pixel of the solid state image capturing element 21; an analog digital (A/D) conversion unit 23 that converts the analog image data output from the analog signal processing unit 22 to a digital image data; a driving unit 24 that drives and controls the A/D conversion unit 23, the analog signal processing unit 22, the solid state image capturing element 21, and the photographing lens 20 in response to a command from a system control unit ("CPU") 29 described down below; and a flash 25 emitting light in response to the command from the CPU 29.

The digital camera 10 of the present invention further includes: a digital signal processing unit 26 that conducts, for example, a interpolation processing or a white balance compensation, a RGB/YC conversion processing by obtaining the digital image data output from the A/D conversion unit 23; a compression/extension processing unit 27 that compresses or extends image data to image data of a JPEG format or the like; a display unit 28 that displays, for example, a menu and a through image or a captured image; a system control unit ("CPU") 29 that performs integrated control of the entire digital camera; am internal memory 30 such as, e.g., a frame memory, a media interface ("I/F") 31 that processes an interface between a storage media 32 storing, for example, JPEG image data and the media interface; and a bus 39 connecting all components described above. Also, an operating unit 33 where a command input from a user is conducted is connected to the system control unit 29.

The user's command input includes, for example, an input command of a focal length of a photographing lens determined by the user (for example, whether it is wide angle photographing or telephoto photographing), whether the photographing mode is a face detection mode or not, whether it is a still image photographing mode or a moving image photographing mode, whether it is a night-view photographing mode or not, whether it is a moving object photographing mode or not, the number of recording pixels, and ISO sensitivity, other than pressing a shutter release button.

The system control unit 29 interprets the captured image data (through image) output in a moving image state from the solid state image capturing element 21 and processed in the digital signal processing unit 26 as described below using an affiliate component thereof such as digital signal processing unit 26 so as to calculate an evaluation curve and detect the distance to a main subject. In addition, the system control unit 29 performs a position control of the focus lens of the photographing lens 20 disposed at the front end of the light path of the solid state image capturing element 21 and causes an optical image that is in-focus on the subject to be formed on the light receiving surface of the solid state image capturing element 21 through a driving unit 24.

The solid state image capturing element 21 is a CMOS type in the present embodiment. Although an output signal of the solid state image capturing element 21 is processed in the analog signal processing unit (AFE: analog front end) 22, the AFE part (e.g., a circuit conducting a correlative double sampling processing or clamping, a signal amplification circuit performing a gain control) is usually installed as a peripheral circuit on a solid state image capturing element chip. Also, other circuits such as a horizontal deflection circuit, a vertical deflection circuit, a noise reduction circuit, and a synchronizing signal generation circuit are formed on the chip of solid state image capturing element 21 around a light receiving part as the peripheral circuit. In some cases, the A/D conversion unit 23 of FIG. 1 is also formed. Further, even if the solid state image capturing element 21 is a CCD type, an embodiment described below is applicable as it is.

Figure 2:
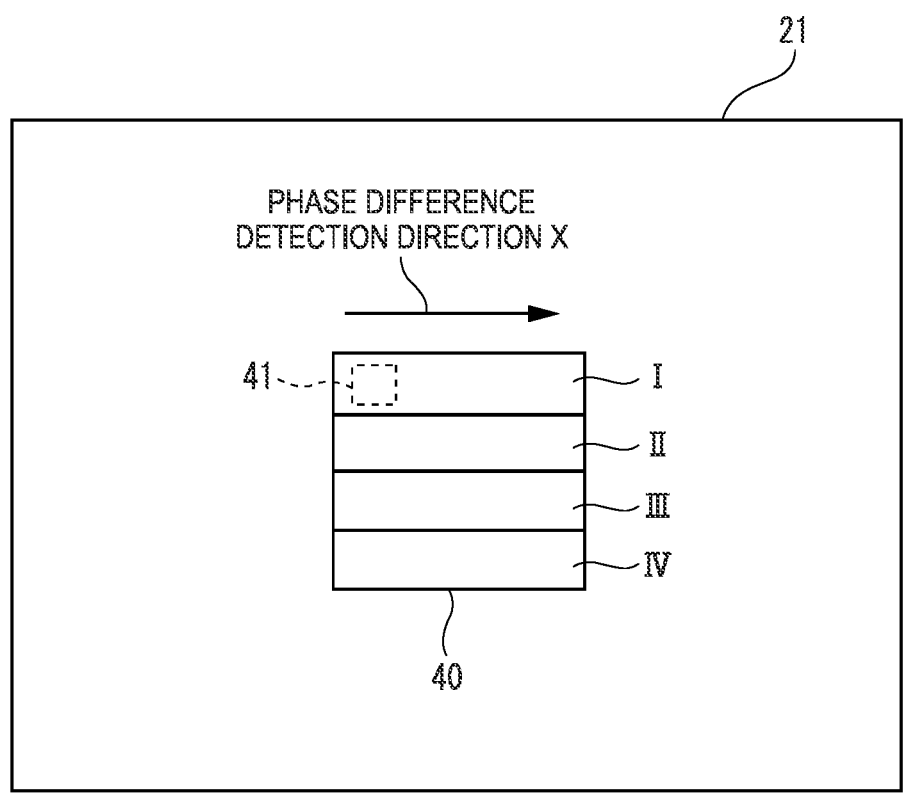
FIG. 2 is an explanatory view of a phase difference detection area provided on a light receiving surface of the solid state image capturing element illustrated in FIG. 1.

FIG. 2 is an explanatory view of the light receiving surface of the solid state image capturing element 21. A plurality of pixels (light receiving elements: photodiodes) not illustrated in the drawing are arranged and formed in a two-dimensional array on the light receiving surface of the solid state image capturing element 21. In the present embodiment, the plurality of pixels are arranged and formed in a square grid arrangement. Also, the pixel arrangement is not limited to the square grid arrangement and may be a so-called honeycomb arrangement in which the pixel rows of even number rows are arranged to be offset by a ½ pixel pitch in relation to the pixel rows of odd number rows, respectively.

A rectangular-shaped phase difference detection area 40 is provided at a position of a partial area on the light receiving surface (at the central position in the illustrated example). Although only one phase difference detection area 40 is provided on the light receiving surface, a plurality of phase difference detection areas may be provided such that the AF is enabled anywhere in the photographing screen. The whole area of the light receiving surface may be used as the phase difference detection area.

The present embodiment is characterized in that a case where the in-focus position to the subject is detected as described below by dividing the phase difference detection area 40 by 4 in the direction (up-and-down direction y) perpendicular to the phase difference detection direction (left-and-right direction, i.e., x direction is the phase difference detection direction in the present example.) and a case where the in-focus position to the subject is detected as one area without dividing the phase difference detection area 40 are switched to each other based on the setting status of the image capturing apparatus 10 (the contents of the input command by the user). Also, the division number is not limited to 4 and it may be 6, 7 and divided by an arbitrary number.

Figure 3:
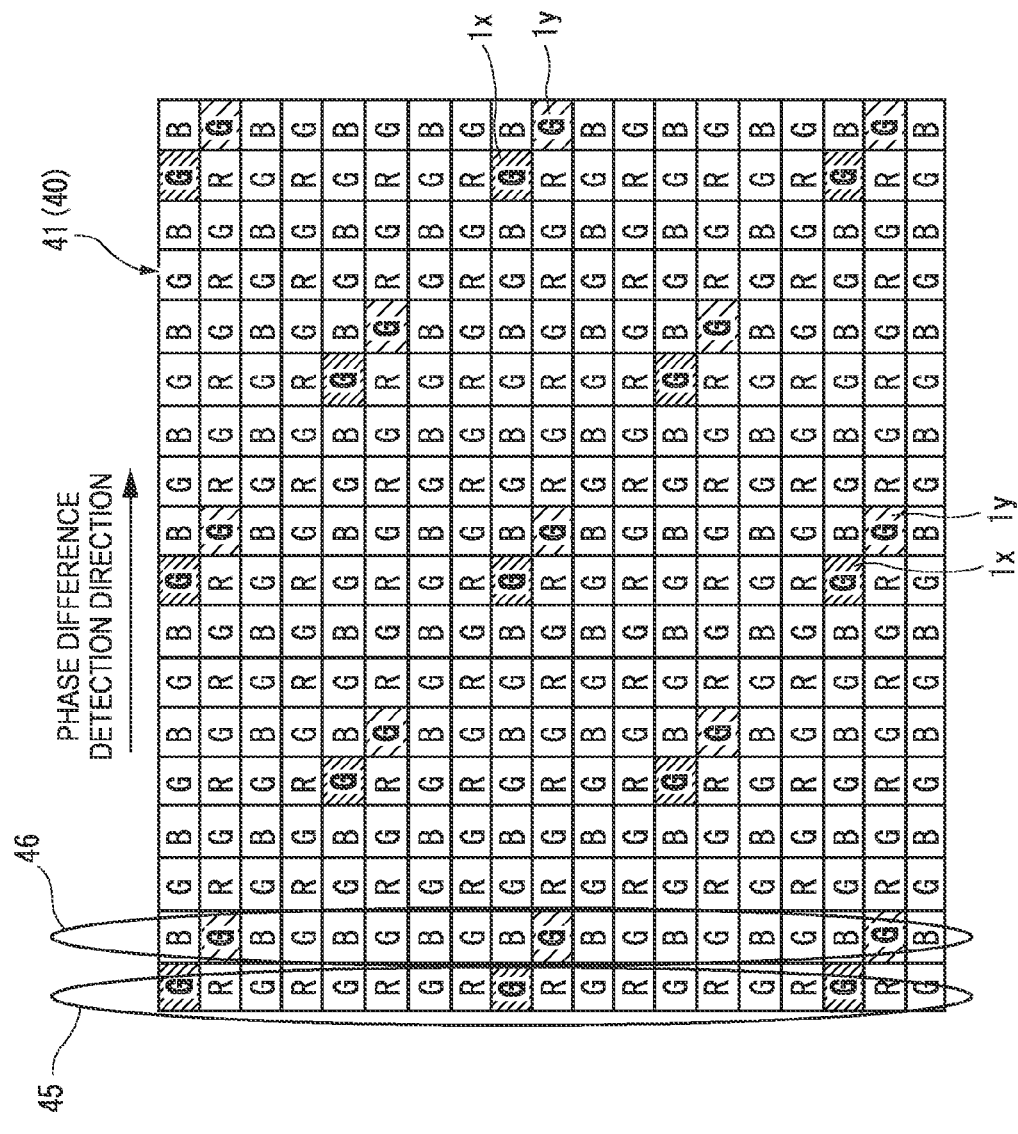
FIG. 3 is an enlarged schematic view of the surface within the dotted lined square-shaped frame of FIG. 2.

FIG. 3 is an enlarged schematic view of the surface of the portion illustrated as a dotted lined rectangular-shaped frame 41 of FIG. 2 within the phase difference detection area 40. A plurality of pixels are arranged as a square grid arrangement on the light receiving surface of the solid state image capturing element 21 which is the same as for the phase difference detection area 40.

In the illustrated example, each pixel is indicated by R (red), G (green), or B (blue). R, G, and B indicate the colors of color filters stacked on pixels, respectively. Although a Bayer arrangement is exemplified in the present example, the arrangement of the color filters is not limited to the Bayer arrangement and it may be another color filter arrangement such as a stripe arrangement.

Although the pixel arrangement and the color filter arrangement within the phase difference detection area 40 are the same as those of the light receiving surface except for the phase difference detection area 40, paired pixels adjacent to each other obliquely within the phase difference detection area 40 are denoted by 1x and 1y, respectively. The pair-pixels for the phase difference detection purpose are provided at the discrete and periodic positions within the phase difference detection area 40 (at check positions in the illustrated embodiment).

Also, the color filter arrangement has the pixels of the same color adjacent to each other obliquely for the Bayer arrangement in the illustrated example. As for a horizontal stripe arrangement, two pixels forming a pair are adjacent to each other widthwise since the pixels of the same color are arranged in the horizontal direction. Alternatively, two pixels forming a pair may not be provided in a filter row of the same color in a horizontal stripe arrangement but may be separated from each other and respectively provided in the filter rows of the same color which are nearest to each other in the vertical direction. The same applies to a vertical stripe arrangement.

In the present embodiment, the phase difference detection pixels 1x, 1y are installed on G filter mounted pixels that are abundant the most among R, G, and B and arranged at intervals of eight pixels in the horizontal direction (x direction) and eight pixels in the vertical direction (y direction) and further to be located at check positions overall. Therefore, when viewed in the phase difference direction (horizontal direction), the phase difference detection pixels 1x are arranged at intervals of 4 pixels.

Figure 4:
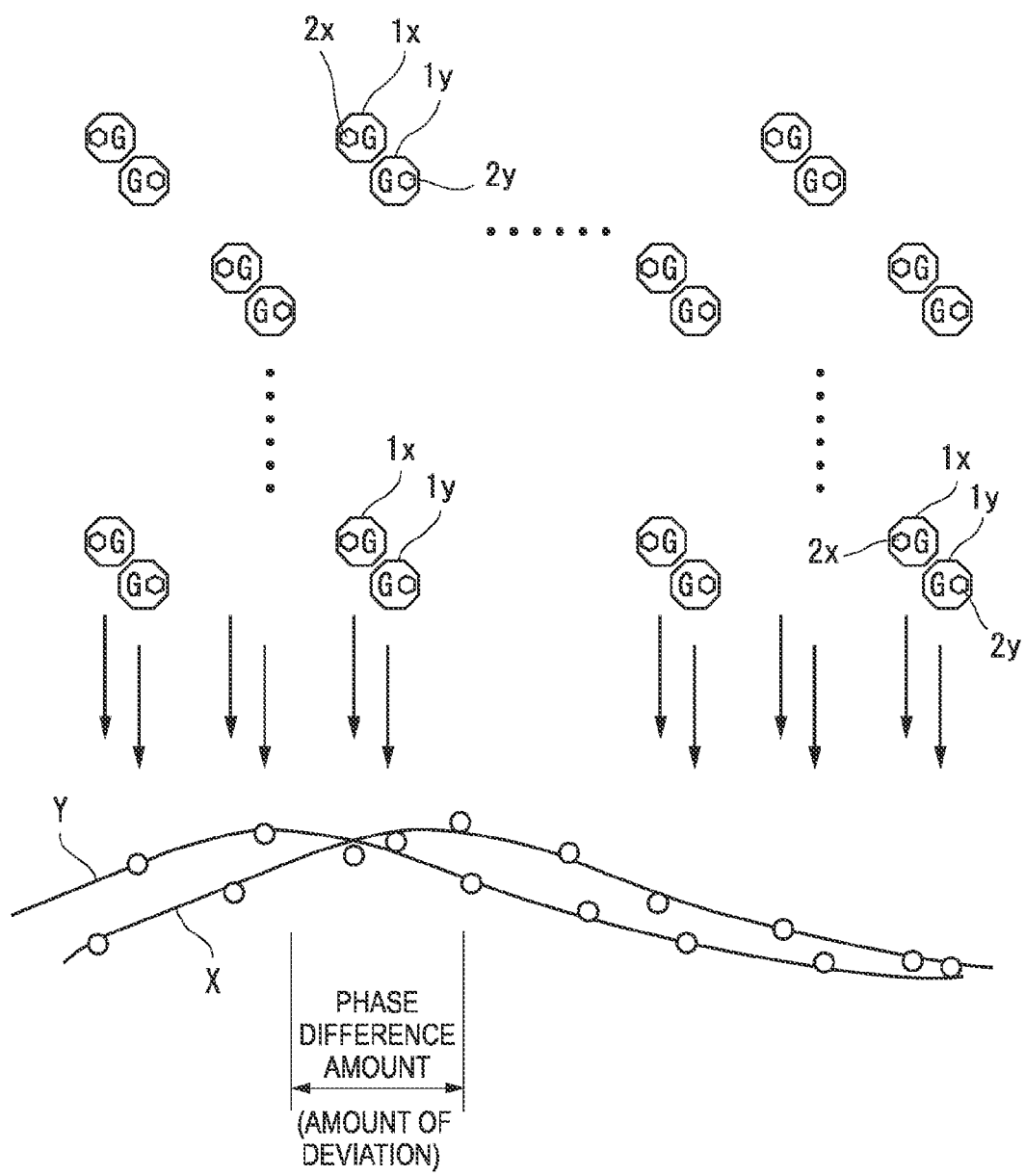
FIG. 4 is a view for describing a concept of a phase difference amount obtained by extracting only the phase difference detection pixels of FIG. 3 and the detected signals of the phase difference detection pixels.

FIG. 4 is a view schematically illustrating only the phase difference detection pixels 1x, 1y extracted from FIG. 3. As for the phase difference detection pixels 1x, 1y which form the pair-pixel, the light shielding apertures 2x, 2y of the phase difference detection pixels are formed smaller than other pixels (pixels other than the phase difference detection pixels) as in Patent Literature 2. Also, the light shielding apertures 2x of the pixels 1x are provided eccentrically in the left direction and the light shielding apertures 2y of the pixels 1y are provided eccentrically in the right direction (phase difference direction).

The curve X illustrated at the lower part of FIG. 4 is a graph in which detection signal amounts of the phase difference detection pixels 1x aligned in one horizontal row are plotted and the curve Y is a graph in which detection signal amounts of the phase difference detection pixels 1y that form pairs with the pixels 1x are plotted.

It is believed that pixels in a pair-pixel 1x and 1y receive light from the same subject since they are adjacent pixels and very close to each other. For this reason, it is believed that the curve X and the curve Y become the same form and the deviation of the left-and-right direction (phase difference direction) becomes a phase difference amount between the image viewed at the pixel 1x of one side of the pupil-divided pair-pixel and the image viewed at the pixel 1y of another side.

By performing a correlative operation of the curve X and the curve Y, the phase difference amount (an amount of horizontal deviation) may be calculated and it becomes possible to calculate the distance to the subject based on the phase difference amount. As for a method of calculating an evaluation value of correlative amount of the curve X and the curve Y, a known method (for example, the method described in Patent Literature 1 or the method described in Patent Literature 2) may be employed. For example, an integrated value of an absolute value of the difference between each of the points X (i) that form the curve X and each of the points Y (i+j) that form the curve Y is set as an evaluation value and a value j that provides the maximum evaluation value is set as the phase difference amount (an amount of horizontal deviation).

However, in a case in which a light receiving area of each and every pixel is small, each signal amount becomes small and the ratio of the noise increases, and, thus, it becomes difficult to detect the phase difference precisely even if the correlative operation is performed. Therefore, if the signals detected from the pixels 1x which are on the same horizontal position are added for a plurality of pixels in the vertical direction and the signals detected from the pixels 1y which are on the same horizontal position are added for a plurality of pixels in the horizontal direction within the phase difference detection area 40 of FIG. 2, the influence of the noise is reduced and it becomes possible to enhance the detection precision (AF precision).

However, it is not always good to increase the number of pixels for pixel addition. When the number of pixels for pixel addition is increased, the arrangement area of the phase difference detection pixels that are the objects of pixel addition in the phase difference detection area 40 is extended in the vertical direction (perpendicular direction) as the number of pixels for pixel addition increases. As for a pattern of a subject, the pattern image captured at the upper part of the phase difference detection area 40, the pattern image captured at the middle part, and the pattern image captured at the lower part are usually different from each other. For this reason, if the phase difference detection area 40 is set as one area and the pixel addition is performed on the pixels thereof based on the subject, there may be a case in which the evaluation value for calculating the phase difference decreases since the patterns of the subject after the pixel addition are equalized in the phase difference detection direction (horizontal direction).

Therefore, in the present embodiment, which subject is targeted to be photographed is known in advance as the setting status of the image capturing apparatus 10 and for a subject that requires high precision AF, the phase difference detection area 40 is divided into four and the range of pixel addition is limited to the inside of each divided area so that the pixel addition is not performed beyond the divided area. That is, a divided area evaluation curve (correlative operation curve) is obtained by performing the pixel addition per each of the divided areas I, II, III, IV and a whole evaluation curve (total evaluation curve) of the phase difference detection area 40 is obtained by adding individual divided area evaluation curve.

Figure 5:
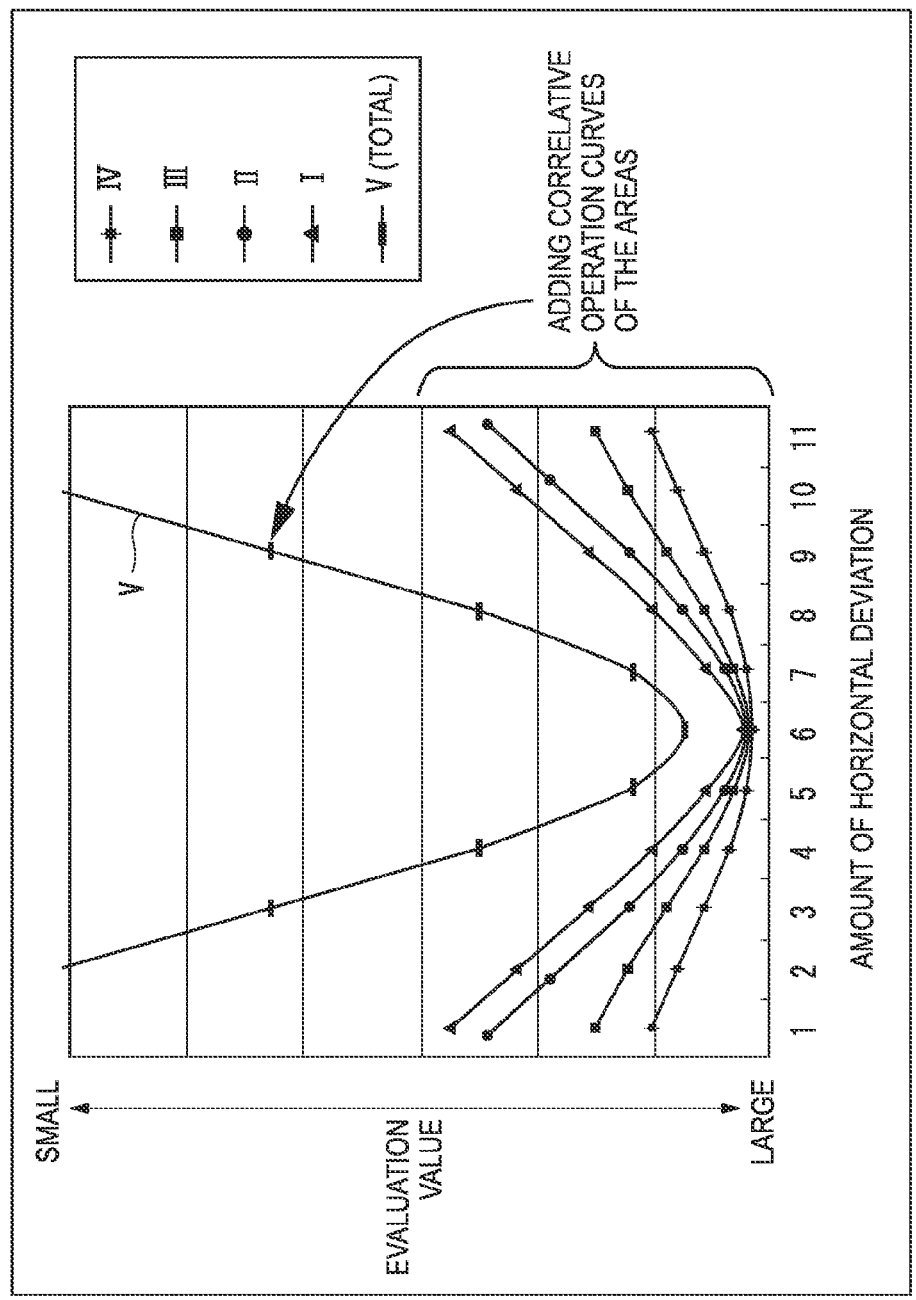
FIG. 5 is an explanatory view of an evaluation curve for each divided area and a summated evaluation curve.

FIG. 5 is a graph illustrating the divided area evaluation curves (correlative operation curves per divided area) I, II, III, IV per each of the divided areas and the total evaluation curve (evaluation curve of whole area) V obtained by performing an operation process (which is "total by addition" in the present embodiment employs but may be either an addition average processing or a multiplication) on the evaluation curve per each of the four divided areas.

The divided area evaluation curve I is obtained by performing the correlative operation on the curve X of FIG. 4 obtained by performing the pixel addition on the detection signals of the phase difference detection pixels 1x within the divided area I in the vertical direction (for example, symbol 45 of FIG. 3) and the curve Y of FIG. 4 obtained by performing the pixel addition on the detection signals of the phase difference detection pixels 1y within the divided area I in the vertical direction (for example, symbol 46 of FIG. 3) within the divided area. In this example, a maximum evaluation value is obtained as a minimum value.

Likewise, the divided area evaluation curve II is an evaluation curve obtained from the divided area II, the divided area evaluation curve III is an evaluation curve obtained from the divided area III, and the divided area evaluation curve IV is an evaluation curve obtained from the divided area IV.

Since the number of pixels for pixel addition to obtain each of the four evaluation curves I, II, III, IV for the four divided areas becomes substantially 1 over the number of divided areas for the pixel number of the phase difference detection pixels 1x arranged in the vertical direction of the phase difference detection area 40, it is less likely that the patterns of the subject are equalized and it becomes possible to calculate the evaluation value precisely.

Then, the phase difference amount (defocus amount) for adjusting the focus lens to the in-focus position is calculated by obtaining the total evaluation curve V by summating the four divided area evaluation curves I, II, III, IV and further performing a sub-pixel interpolation in the total evaluation curve V. Accordingly, it becomes possible to perform the highly precise calculation of the phase difference which is robust to noise while maintaining the evaluation value of each of the divided areas of the subject.

In FIG. 5, since one unit of the axis of abscissas is the pixel interval of the phase difference detection pixels of FIG. 3 (since it is a check arrangement at intervals of eight pixels, it becomes an interval of 4 pixels), a position that provides the true minimum value (the maximum evaluation value), that is, the phase difference amount is calculated by performing the sub-pixel interpolation considering, for example, the position of the minimum value of the total evaluation curve V and each slope of a curve extending to the right side and a curve extending to the left side for the minimum value. Thus, it becomes possible to calculate the phase difference amount by one-pixel unit of FIG. 3.

As described above, it becomes possible to calculate the in-focus position with high precision by dividing the phase difference detection area into plural areas and performing the correlative operation for each of the divided areas. However, since the correlative operation takes time, the increase of the division number serves as a factor of hindering the speed up of AF.

Therefore, in the present embodiment, in a case in which it may be determined that the AF precision is high even if the pixel addition of the phase difference detection pixels is performed by setting the phase difference detection areas 40 as one area without dividing the phase difference detection area 40 based on the setting status of the image capturing apparatus, the in-focus position is calculated by obtaining an optimum value. And the optimum value is obtained by performing the pixel addition on the phase difference detection pixels 1x and 1y within the phase difference detection area 40 in the vertical direction and performing the correlative operation on the curve X of FIG. 4 for the addition signals of the pixels 1x and the curve Y of FIG. 4 for the addition signals of the pixels 1y. Accordingly, the speed-up of the AF operation is facilitated.

Also, the in-focus position is calculated by the method described in FIG. 5 when which subject is targeted to be photographed is known from the setting status of the image capturing apparatus and it is believed that it might be desirable to divide the phase difference detection area 40 to increase the AF precision.

Figure 6:
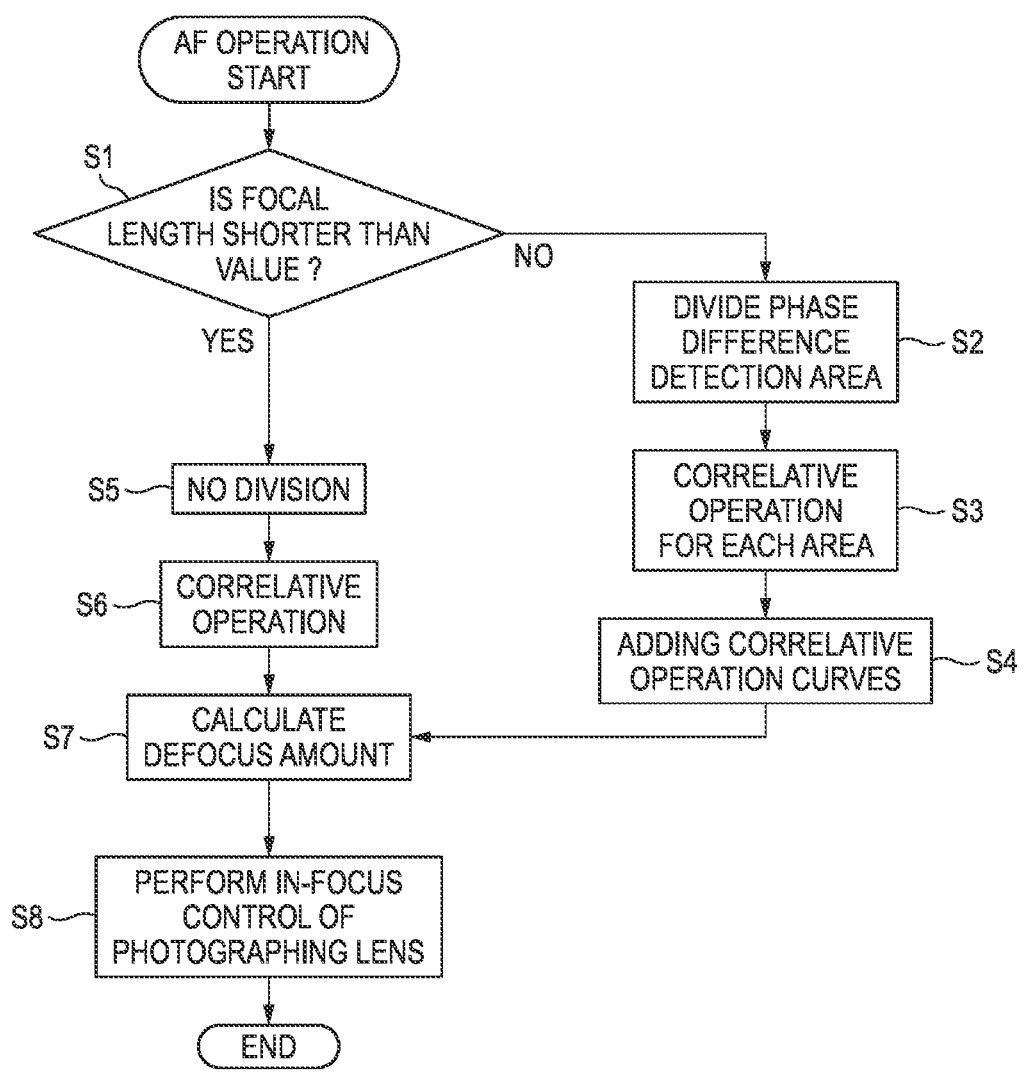
FIG. 6 is a flowchart illustrating an AF processing sequence according to a first embodiment of the present invention.

FIG. 6 is a flowchart illustrating an AF processing sequence according to the first embodiment of the present invention which is the system control unit 29 executed by using a subordinate unit, for example, the digital signal processing unit 26.

When the AF operation starts, it is determined whether the focal length is shorter than a value or not in step S1 firstly (step S1). For example, when the user inputs the telephoto side photographing setting, since the focal length becomes long, step S2 is followed in which the phase difference detection area 40 is divided into plural areas. In the present example, it is divided into 4 areas.

Then, the divided area evaluation curves I, II, III, IV are calculated by performing the correlative operation per each of the divided areas in the next step S3 and the total evaluation curve V is obtained by summating the divided area evaluation curves I, II, III, IV in the next step S4.

Then, step S7 is followed in which an optimum evaluation value is obtained for the total evaluation curve V by performing the sub-pixel interpolation and the phase difference amount (defocus amount) that provides the optimum evaluation value is calculated. Then, an in-focus control is performed by controlling the position of the focus lens in the next step S8 and the processing is terminated.

For example, when the user inputs the wide angle side photographing setting, since the focal length is short as a result of the determination of step S1, step S1 is followed by step S5. The phase difference detection area 40 is handled as one area without being divided in step S5 and the correlative operation is performed on the curve X of FIG. 4 obtained in the phase difference detection pixel 1x added in the phase difference detection area 40 and the curve Y obtained in the phase difference detection pixel 1y in step S6. And then, the defocus amount is calculated (step S7) based on the total evaluation curve obtained as a result of the correlative operation and the in-focus control of the focus lens is performed (step S8).

In a case in which the same subject is photographed with different focal lengths, a subject image with a short focal length has a lot of high frequency components and a subject image with a long focal length has a lot of low frequency components. When considered in the aspect of AF precision, since the phase difference AF is highly reliable when a lot of high frequency components exist generally, enough precision may be obtained without dividing the area. On the contrary, when a lot of low frequency components exist, AF precision may be enhanced by dividing the area.

The increase of the division number serves as a factor of hindering the speed up of AF since it takes time to perform the correlative operation. Therefore, in the present embodiment, the division of the phase difference detection area 40 is avoided when photographing in the short focal length where it is considered that the AF precision is originally high and the phase difference detection area 40 is divided only when photographing in the long focal length so as to facilitate the enhancement of AF precision. Accordingly, in the present embodiment, the high speed AF and the high precision AF that are equivalent to those of the single lens reflex camera may be obtained even with the image capturing apparatus provided with a small image capturing element.

Figure 7:
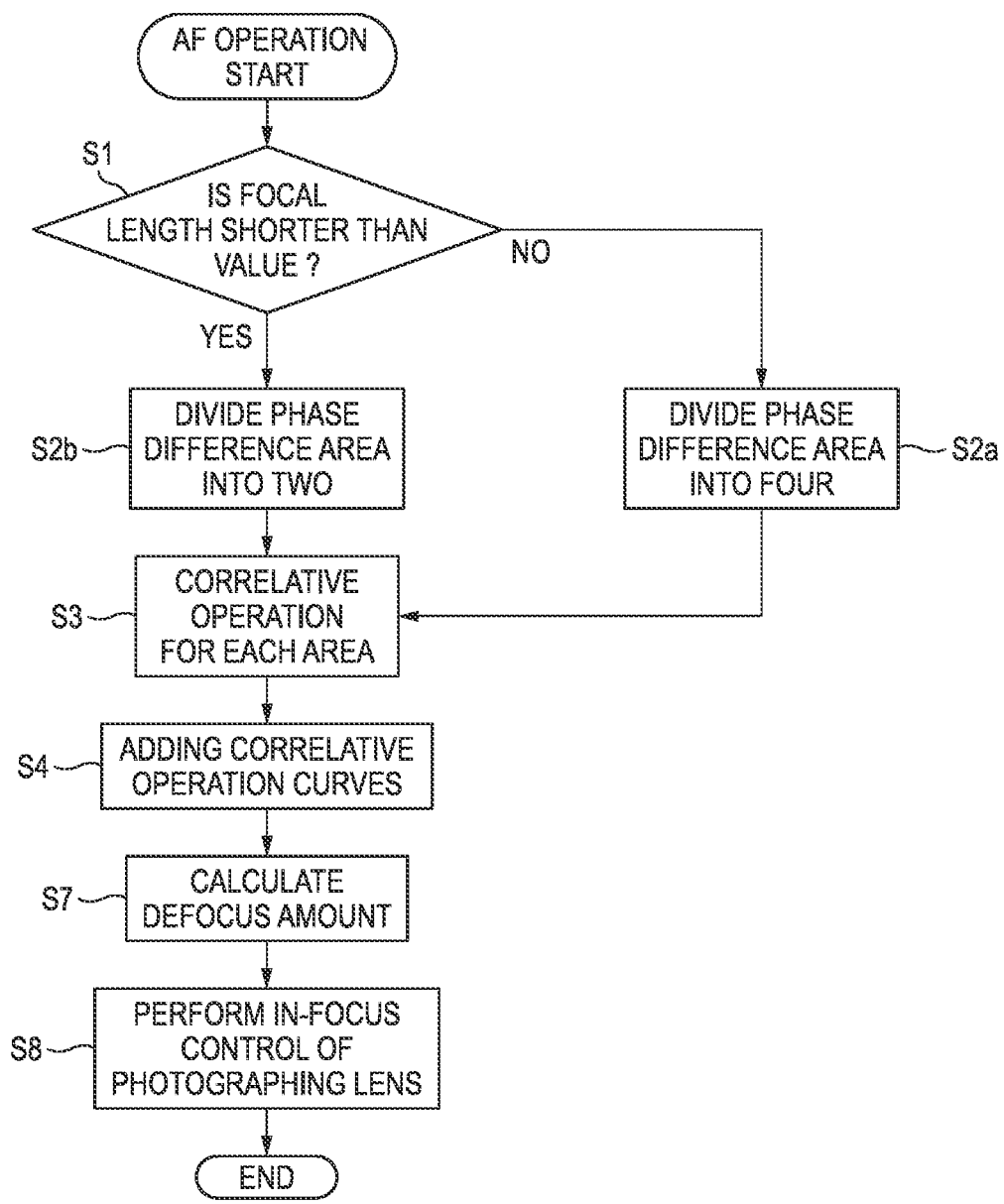
FIG. 7 is a flowchart illustrating an AF processing sequence according to a second embodiment of the present invention.

FIG. 7 is a flowchart illustrating a processing sequence according to the second embodiment of the present invention. The processing steps that are the same as those in FIG. 6 are assigned with the same step numbers and the detailed descriptions thereof will be omitted.

In the present embodiment, the focal length is determined in step S1. When photographing in the long focal length, step S2a is followed in which the area division number is set as "4". Also, when photographing in the short focal length, step S2b is followed in which the area division number is set as "2". And then, steps S3, S4, S7, S8 are followed and the processing is terminated.

In the embodiment of FIG. 6, although case classification of "dividing the area" and "not dividing the area" is conducted, it is not required always to select the division number "1" which does not divide the area. The shortening of correlative operation processing time and the speed-up of the AF operation may be facilitated by decreasing the area division number as in the embodiment of FIG. 7.

Figure 8:
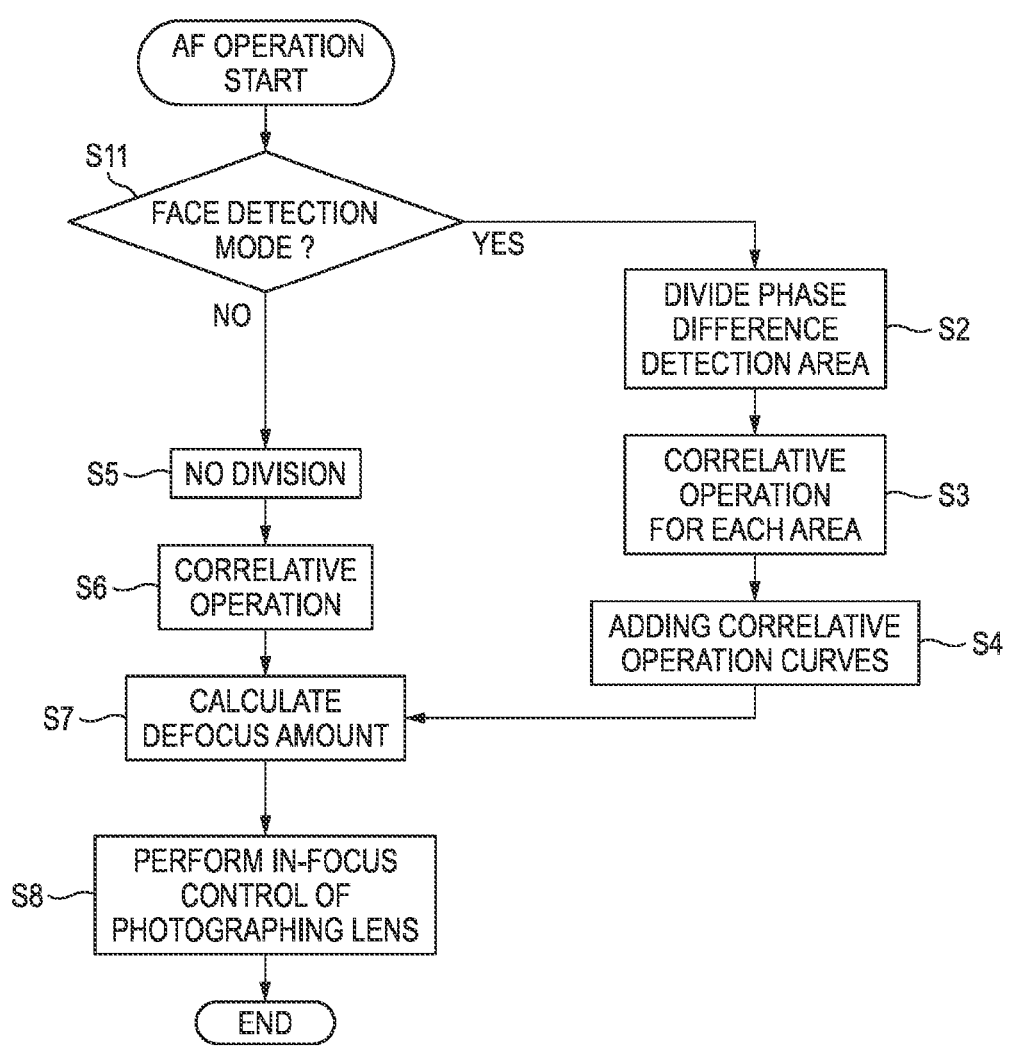
FIG. 8 is a flowchart illustrating an AF processing sequence according to a third embodiment of the present invention.

FIG. 8 is a flowchart illustrating a processing sequence according to the third embodiment of the present invention. The processing steps that are the same as those in FIG. 6 are assigned with the same step numbers and the detailed descriptions thereof will be omitted.

In the present embodiment, in step S11, it is determined whether the image capturing apparatus 10 is set in the face detection mode or not. In a case in which the apparatus is set in the face detection mode, step S2 is followed in which the phase difference detection area 40 is divided. Then, the following processing steps S3, S4, S7, S8 are followed. In a case in which the apparatus is not set in the face detection mode, step S5 is followed by step S11, in which the phase difference detection area 40 is handled as one area. Then, the following processing steps S6, S7, S8 are followed.

In a case in which the face detection mode is set, it may be determined that the main subject is a person. Since a human face is generally a low frequency image, it is difficult to determine a focus position. Thus, step S2 is followed to divide the phase difference detection area 40, thereby enhancing the AF precision. In a case in which the face detection mode is not set, it may be determined that the main subject is an object other than a person. Even if the person is reflected in the subject, it is just a part of the background and the person does not need to be focused on. Therefore, the phase difference detection area 40 is handled as one area in step S5 and the speed-up of the AF operation is facilitated.

Figure 9:
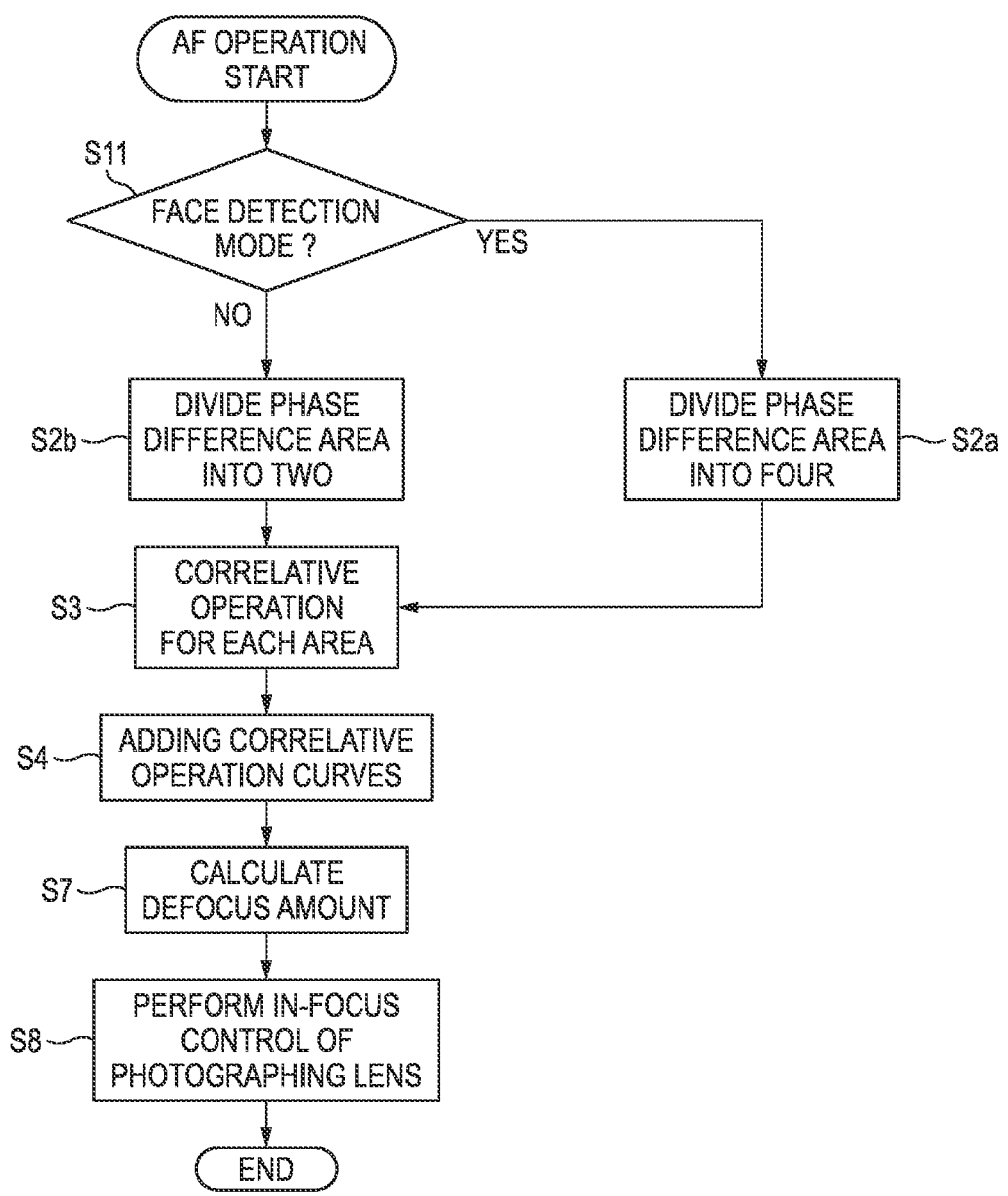
FIG. 9 is a flowchart illustrating an AF processing sequence according to a fourth embodiment of the present invention.

FIG. 9 is a flowchart illustrating a processing sequence according to the fourth embodiment of the present invention. The processing steps that are the same as those in FIG. 7 are assigned with the same step numbers and the detailed description thereof will be omitted.

In the present embodiment, in step S11, it is determined whether the image capturing apparatus 10 is set in the face detection mode or not. In a case in which the apparatus is set in the face detection mode, step S2a is followed to divide the phase difference detection area 40 into 4 and then the following steps S3, S4, S7, S8 are followed. In a case in which the apparatus is not set in the face detection mode, step S2b is followed to divide the phase difference detection area 40 into 2 and then the following steps S3, S4, S7, S8 are followed. In this manner, either the high enhancement of the AF precision or the speed-up of the AF operation is selected depending on whether the apparatus is set in the face detection mode or not as in FIG. 8 in the present embodiment.

Figure 10:
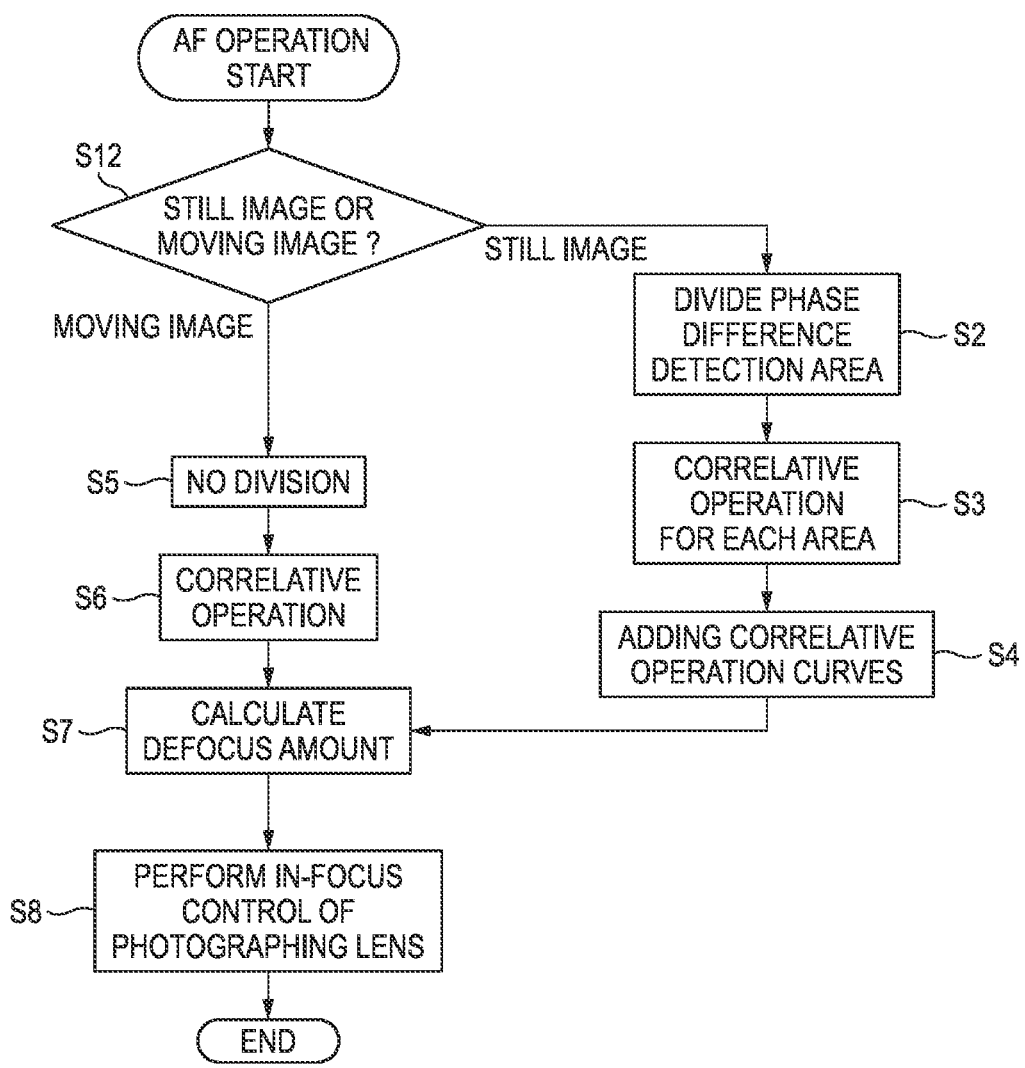
FIG. 10 is a flowchart illustrating an AF processing sequence according to a fifth embodiment of the present invention.

FIG. 10 is a flowchart illustrating a processing sequence according to the fifth embodiment of the present invention. The processing steps that are the same as those in FIG. 8 are assigned with the same step numbers and the detailed descriptions thereof will be omitted.

In the present embodiment, in step S12, it is determined whether the image capturing apparatus 10 is set in the moving image photographing mode or not. In a case in which the apparatus is set in the still image photographing mode, the phase difference detection area 40 is divided into plural areas (step S2) and in a case in which the apparatus is set in the moving image photographing mode, the speed-up of the AF operation is facilitated by setting the phase difference detection area 40 as one area (step S5).

Generally, an in-focus high definition image is required for a still image and the definition required in the moving image is lower than that of the still image. Thus, the area division is conducted to increase the AF precision in the still image photographing mode and it is preferable not to conduct the area division for the speed-up of the AF operation in the moving image photographing mode.

Figure 11:
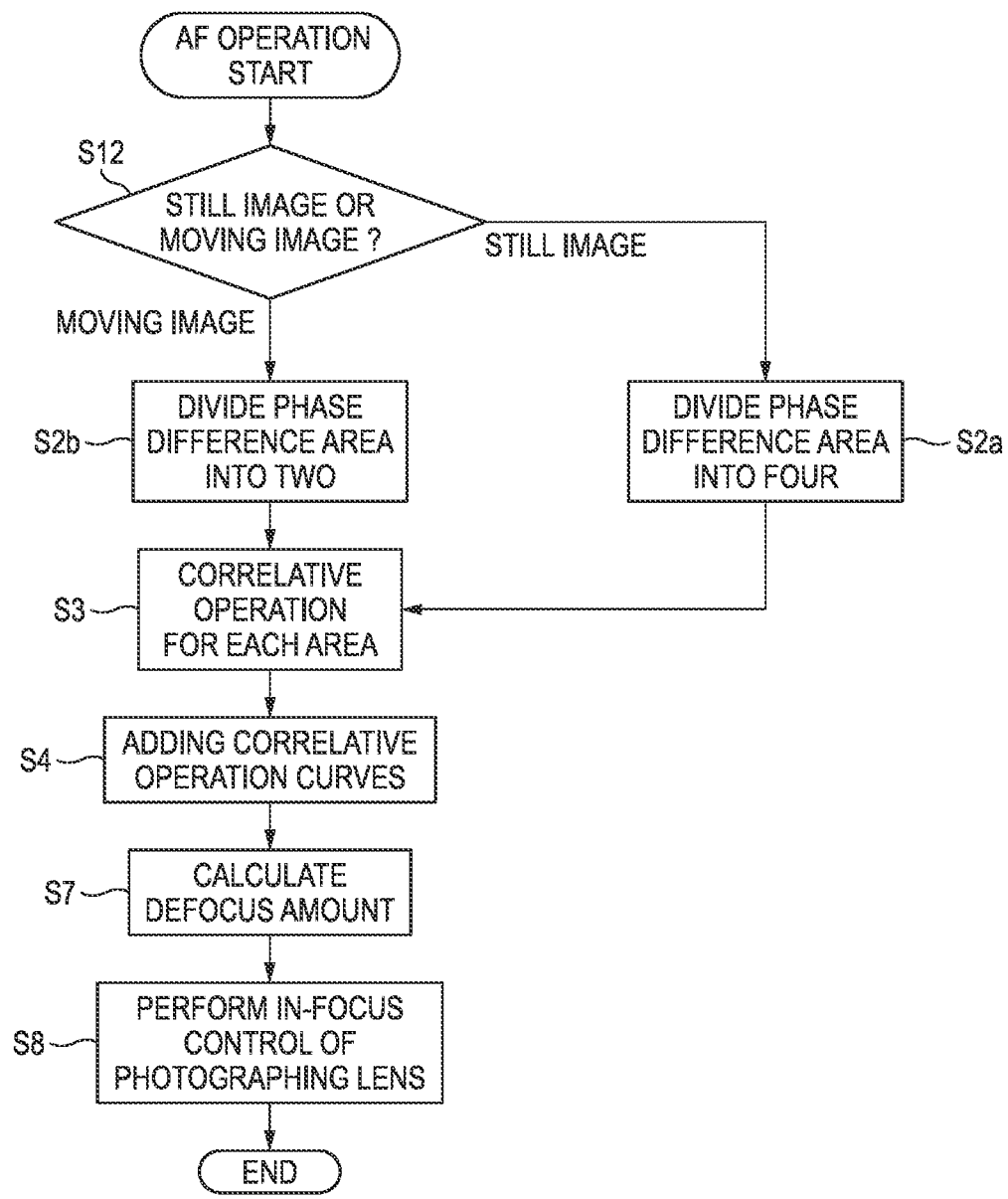
FIG. 11 is a flowchart illustrating an AF processing sequence according to a sixth embodiment of the present invention.

FIG. 11 is a flowchart illustrating a processing sequence according to the sixth embodiment of the present invention. The processing steps that are the same as those in FIG. 9 are assigned with the same step numbers and the detailed description thereof will be omitted.

In the present embodiment, in step S12, it is determined whether the image capturing apparatus 10 is set in the still image photographing mode or in the moving image photographing mode. In a case in which the apparatus is set in the still image photographing mode, the phase difference detection area 40 is divided into 4 (step S2*a*) to enhance the AF precision. In a case in which the apparatus is set in the moving image photographing mode, the phase difference detection area is divided into 2 (step S2*b*) to facilitate the speed-up of the AF operation by reducing the division number.

Figure 12:
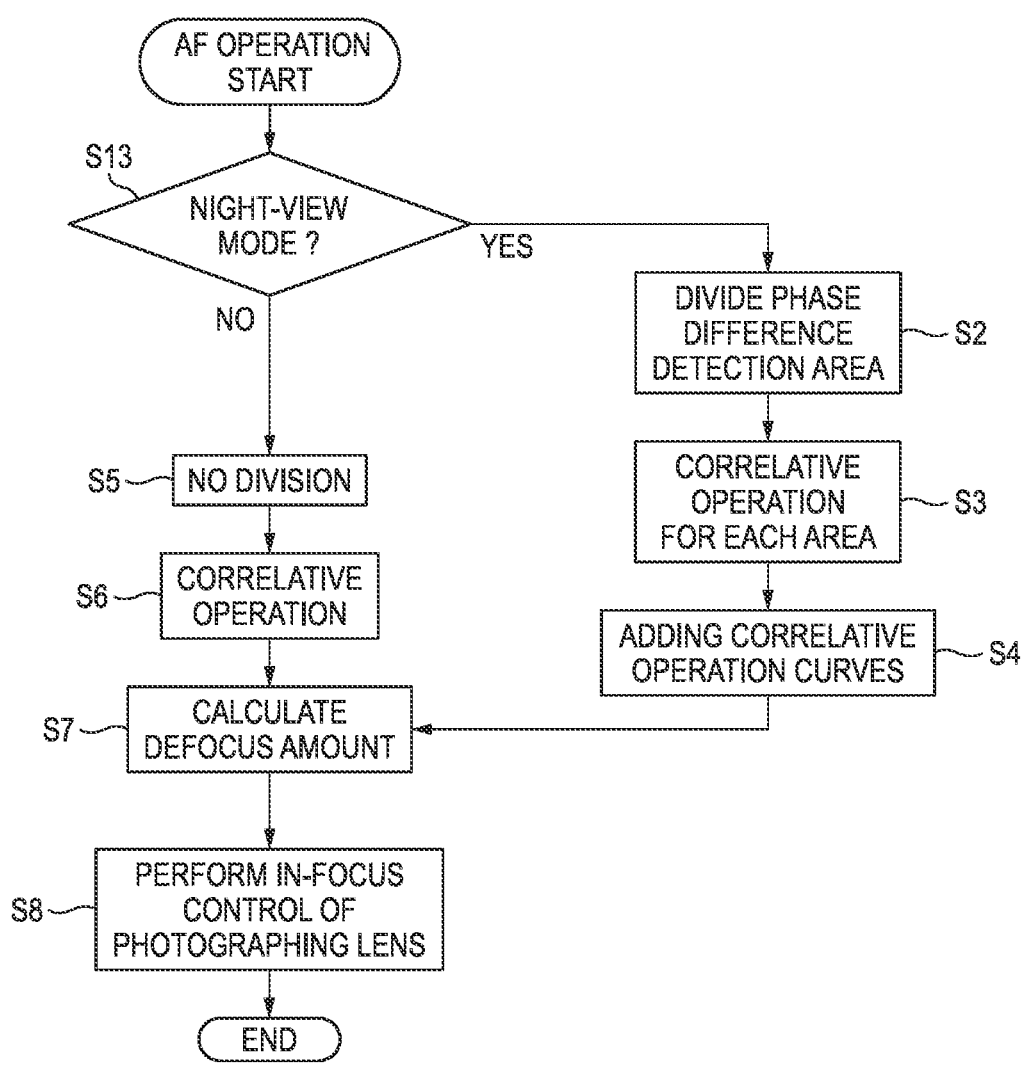
FIG. 12 is a flowchart illustrating an AF processing sequence according to a seventh embodiment of the present invention.

FIG. 12 is a flowchart illustrating a processing sequence according to the seventh embodiment of the present invention. The processing steps that are the same as those in FIG. 8 are assigned with the same step numbers and the detailed descriptions thereof will be omitted.

In the present embodiment, in step S13, it is determined whether the image capturing apparatus 10 is set in the night-view photographing mode or not. In a case in which the apparatus is set in the night-view photographing mode, step S2 is followed and in a case in which the apparatus is not set in the night-view photographing mode, step S5 is followed.

As for the night-view, it is difficult to obtain the AF precision since the subject is dark generally. For this reason, in a case in which the apparatus is set in the night-view photographing mode, step S2 is followed to divide the phase difference detection area, thereby facilitating the speed-up of the AF operation.

Figure 13:
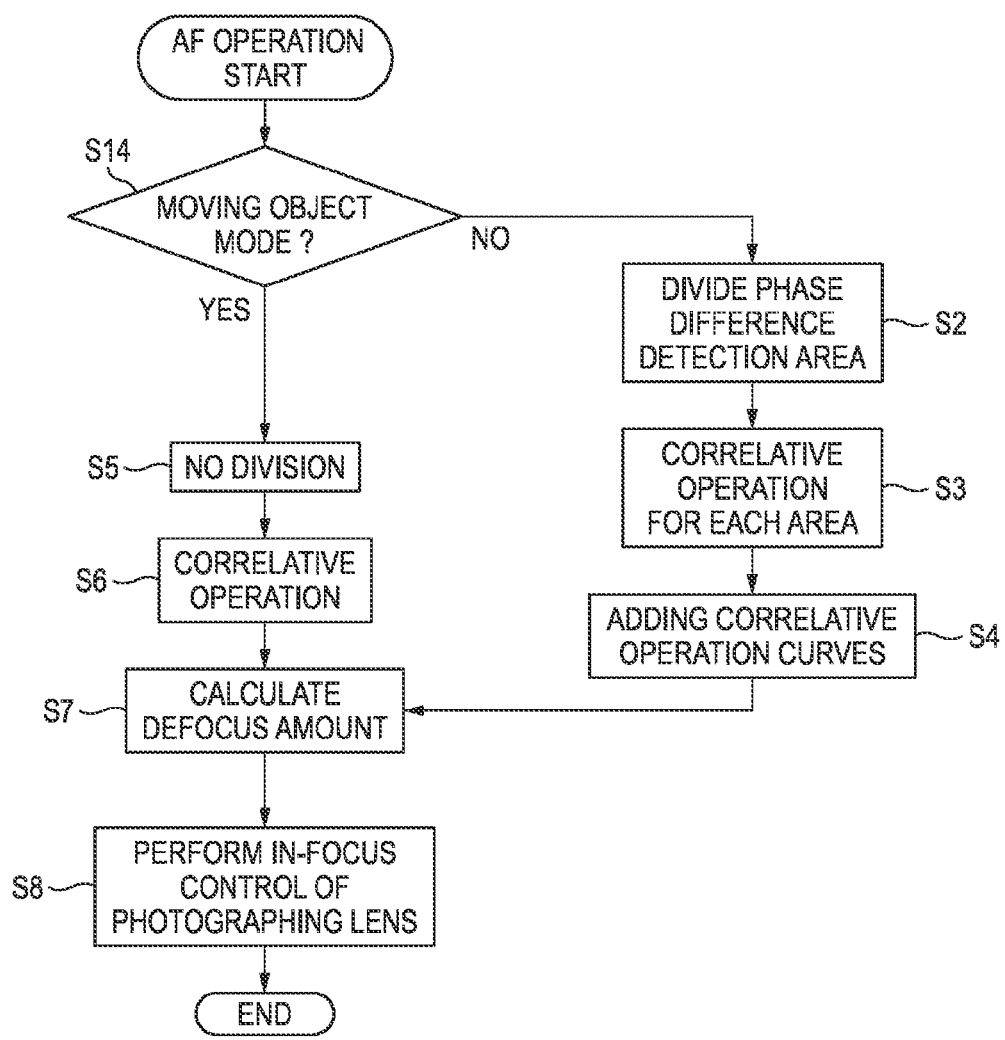
FIG. 13 is a flowchart illustrating an AF processing sequence according to an eighth embodiment of the present invention.

FIG. 13 is a flowchart illustrating a processing sequence according to the eighth embodiment of the present invention. The processing steps that are the same as those in FIG. 8 are assigned with the same step numbers and the detailed descriptions thereof will be omitted.

In the present embodiment, in step S14, it is determined whether the image capturing apparatus 10 is set in the moving object photographing mode or not. In a case in which the apparatus is set in the moving object photographing mode, step S5 is followed and in a case in which the apparatus is not set in the moving object photographing mode, step S2 is followed.

The AF speed may be calculated in a case in which the moving object is photographed, that is, in a case in which moving subject is photographed. Therefore, in the moving object photographing mode, step S5 is followed in which the in-focus position is detected in the phase difference AF without dividing the area taking a serious view of the AF speed.

Figure 14:
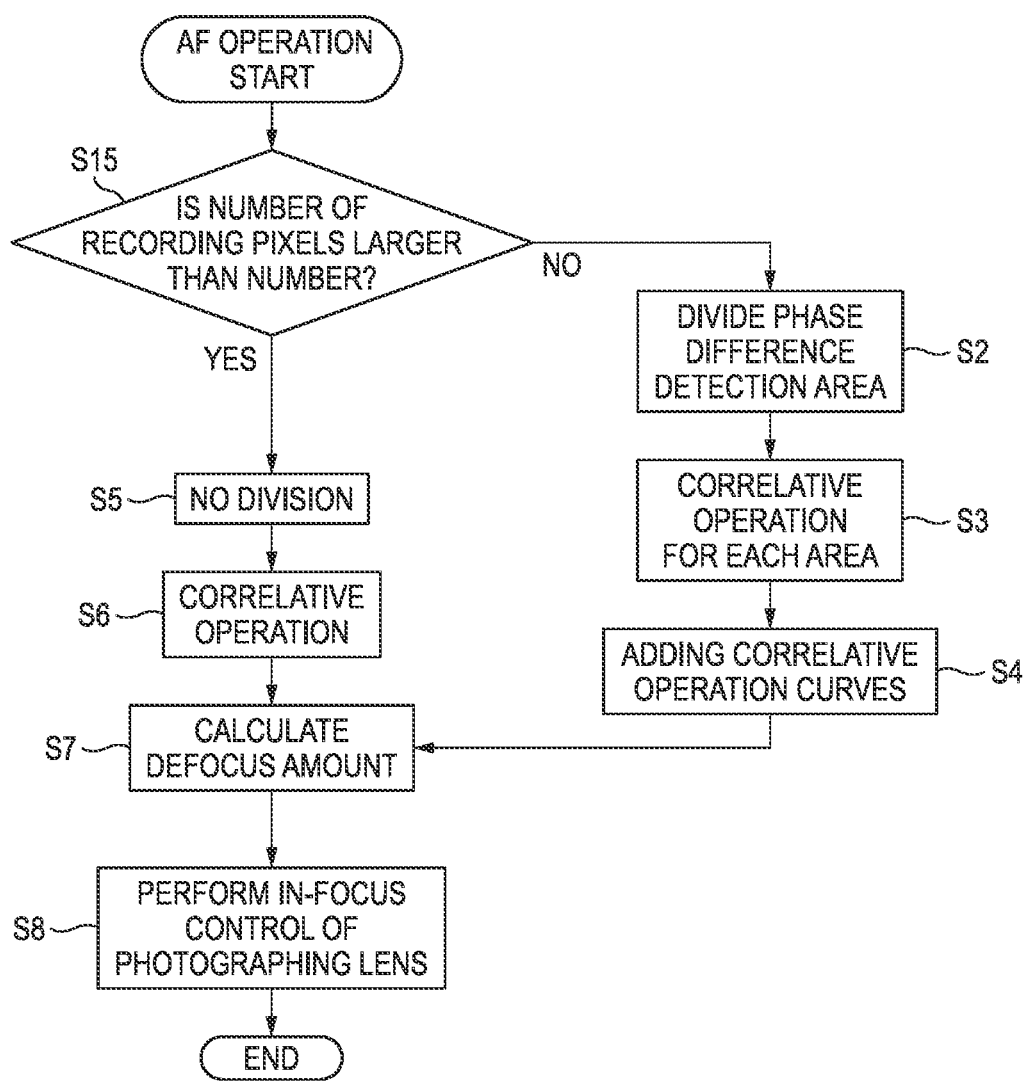
FIG. 14 is a flowchart illustrating an AF processing sequence according to a ninth embodiment of the present invention.
Figure 15:
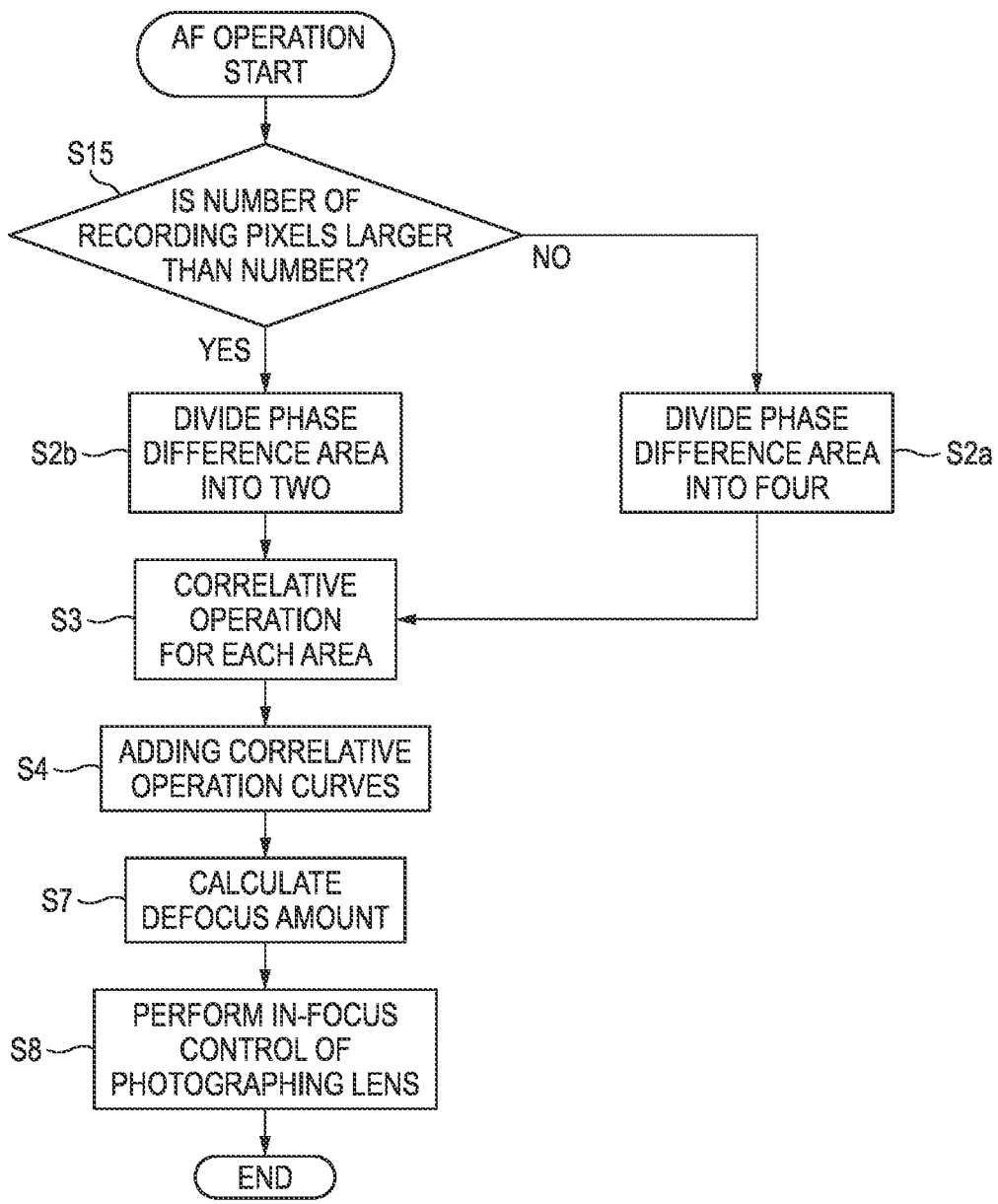
FIG. 15 is a flowchart illustrating an AF processing sequence according to a tenth embodiment of the present invention.

FIGS. 14 and 15 are flowcharts illustrating an AF processing sequence according to the ninth and the tenth embodiments of the present invention, respectively. The processing steps that are the same as those in FIG. 8 and FIG. 9 are assigned with the same step numbers and the detailed descriptions thereof will be omitted. In these embodiments, in step S15, it is determined whether the setting of the number of recording pixels is larger than a number or not.

The precision required for the AF (auto focus) depends on the pitch of the pixel. As the number of the storing pixel increases, the precision required for the AF increases. Therefore, in a case in which the number of the storing pixel is large, step S2 (or step S2*a* of FIG. 15) is followed to increase the area division number and in a case in which the number of the storing pixel is small, step S5 of FIG. 14 (or step S2*b* of FIG. 15) is followed to decrease the area division number.

Figure 16:
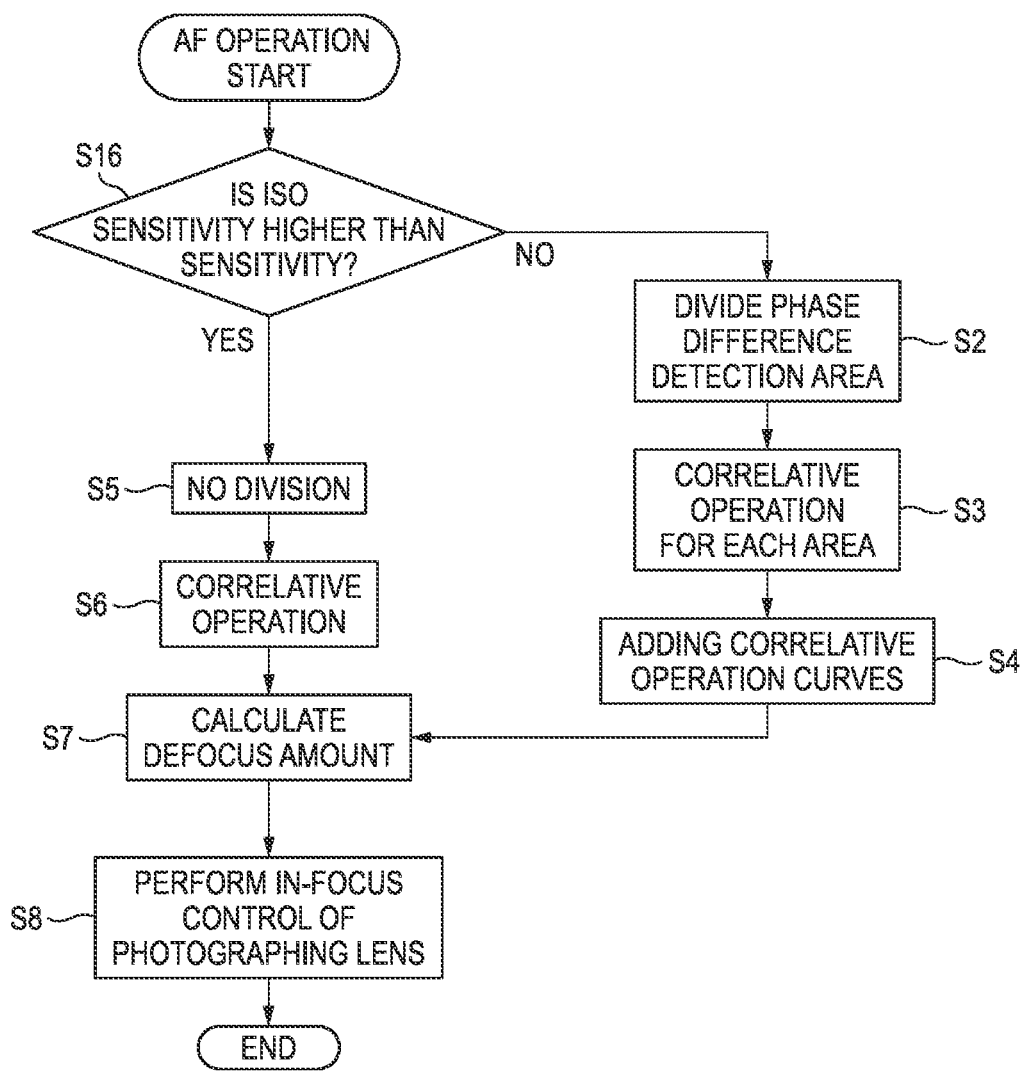
FIG. 16 is a flowchart illustrating an AF processing sequence according to an eleventh embodiment of the present invention.
Figure 17:
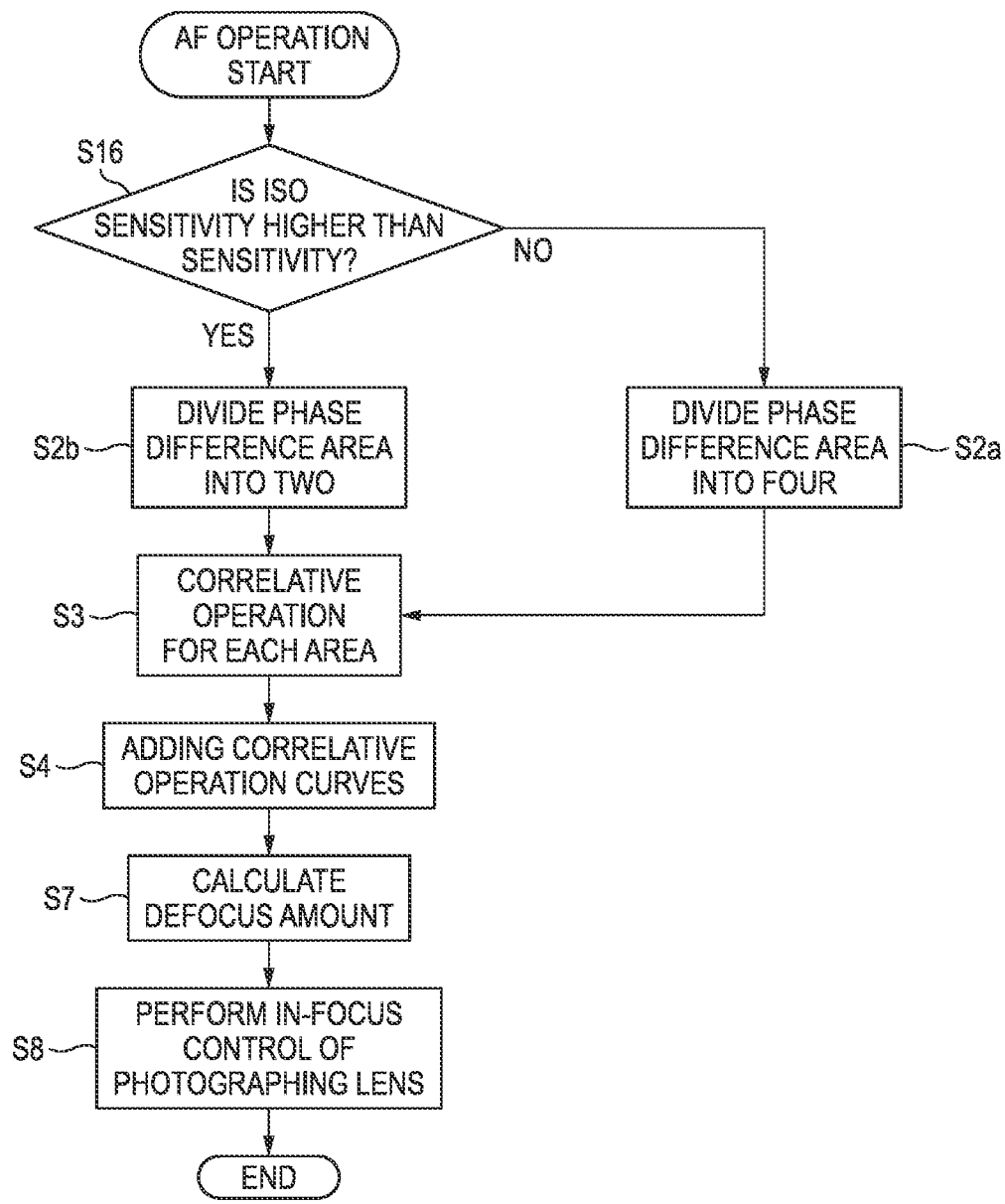
FIG. 17 is a flowchart illustrating an AF processing sequence according to a twelfth embodiment of the present invention.

FIGS. 16 and 17 are flowcharts illustrating a processing sequence according to the eleventh and the twelfth embodiments of the present invention, respectively. The processing steps that are the same as those in FIG. 8 and FIG. 9 are assigned with the same step numbers and the detailed descriptions thereof will be omitted. In the above-described embodiments, in step S16, it is determined whether the ISO sensitivity set in the image capturing apparatus 10 is higher than a sensitivity or not.

As the ISO sensitivity decreases, the noise becomes less and the required precision of the AF becomes higher. Therefore, in a case in which the ISO sensitivity is low, step S2 of FIG. 16 (or step S2*a* of FIG. 17) is followed to increase the area division number. Also, in a case in which the ISO sensitivity is high, step S5 of FIG. 16 (or step S2*b* of FIG. 17) is followed to decrease the area division number.

As described above, in each of the above-described embodiments, whether the subject needs the AF precision and whether the subject needs the high speed AF are determined based on the setting information such as the photographing mode and the like of the image capturing apparatus 10 and then the division number of the phase difference detection area is determined. Thus, the phase difference AF processing may be conducted by using a proper area division number according to the subject image and it becomes possible to obtain the high speed AF and the high precision AF that are equivalent to those of the single lens reflex camera even with the image capturing apparatus installed with a small image capturing element.

Also, although each of the embodiments has been described individually using FIGS. 6 to 12, it is apparent that plural embodiments may be combined. For example, as for the night-view photographing mode, it has been described that the area is not divided in a case in which the apparatus is not set in the night-view photographing mode. However, in a case in which the apparatus is not set in the night-view photographing mode, it is determined whether the apparatus is set in another photographing mode or not and when the apparatus is in another photographing mode, it is determined whether the high speed AF is needed or the high precision AF is needed so that the presence/absence of the area division or the area division number may be switched.

Further, although the camera side has automatically determined whether the subject needs the high speed AF based on the setting information such as the photographing mode and the like in each of the above-described embodiments, it may be configured such that the high speed AF/the high precision AF may be set and input by the user, and the area division number may be designated and input by the user.

In addition, although the description has been made by using an example in which the light shielding apertures are formed to be small as pupil-divided pair-pixels forming the phase difference detection pixels and disposed to be offset in the opposite directions in the above-described embodiments, the method to form the phase difference detection pixels by pupil-dividing is not limited thereto. For example, a pair-pixel may be pupil-divided by installing a micro lens thereon.

Further, although the total evaluation curve has been obtained by adding all the divided area evaluation curves in the above-described embodiments, it is not necessary to take all the divided area evaluation curves as objects to be added (objects to be processed by an operation processing), and it is possible to further facilitate the enhancement of the AF precision performing the addition and calculating the correlative operation curves of a plurality of areas, except for a divided area evaluation curve which is not reliable or a divided area evaluation curve which has a position of the minimum value largely different from that of other divided area evaluation curves.

Further, although the descriptions have been made about an example in which pair-pixels that detect the phase difference are installed on the discrete and periodic positions in the above-described embodiments, the pair-pixels are not necessarily installed on the periodic and discrete positions and may be at the random positions (even if the phase difference detection pixels installed in the same row are at the random positions, the curves X, Y may be calculated.). Also, all the pixels may be set as phase difference detection pixels.

An image capturing apparatus and an in-focus position detection method of the embodiments discussed above is characterized in that the image capturing apparatus comprises: an image capturing element where a pair-pixel configured by a first phase difference detection pixel and a second phase difference detection pixel that are pupil-divided is arranged two-dimensionally in a phase difference detection area provided on a light receiving surface that captures an image of a subject; a focus lens that is disposed at the front end of a light path of the image capturing element and forms an optical image which is in-focus on the subject on the light receiving surface; and a control means that calculates a phase difference between a first distribution curve of first detection information output from the first phase difference detection pixel in relation to one side arrangement direction of the pair-pixel and a second distribution curve of second detection information output from the second phase difference detection pixel in relation to the one side arrangement direction and drives and controls the focus lens to the in-focus position based on the phase difference, in which the in-focus position detection method comprises: determining whether to set a division number into which the phase difference detection area is divided in a direction perpendicular to the detection direction of the phase difference to a first division number n or to a second division number m which is larger than n based on a setting status of the image capturing apparatus, calculating a correlative operation curve for each divided area by calculating a correlation between the first detection information and the second detection information for each of the divided areas formed by dividing the phase difference detection area into the n or the m, and acquiring a defocus amount to drive and control the focus lens to the in-focus position from a total evaluation curve obtained by conducting a required calculation processing on the correlative operation curves of the plural divided areas.

And, the image capturing apparatus and the in-focus position detection method of the embodiments are characterized in that the first division number n includes 1 and the correlative operation curve of the divided area when n=1 is set as the correlative operation curve of the plural divided areas.

And, the image capturing apparatus and the in-focus position detection method of the embodiments are characterized in that the setting status of the image capturing apparatus is determined based a focal length, so that the first division number n is selected when the focal length is less than or equal to a value and when the focal length is more than the value, the second division number m is selected.

And, the image capturing apparatus and the in-focus position detection method of the embodiments are characterized in that the setting status of the image capturing apparatus is determined based on whether a face detection mode is set or not, so that when the face detection mode is not set, the first division number n is selected and when the face detection mode is set, the second division number m is selected.

And, the image capturing apparatus and the in-focus position detection method of the embodiments are characterized in that the setting status of the image capturing apparatus is determined based on whether a still image photographing mode is set or a moving image photographing mode is set, so that when the moving image photographing mode is set, the first division number n is selected and when the still image photographing mode is set, the second division number m is selected.

And, the image capturing apparatus and the in-focus position detection method of the embodiments are characterized in that the setting status of the image capturing apparatus is determined based on whether a night-view mode is set or not, so that when the night-view mode is not set, the first division number n is selected and when the night-view mode is set, the second division number m is selected.

And, the image capturing apparatus and the in-focus position detection method of the embodiments are characterized in that the setting status of the image capturing apparatus is determined based on whether a moving object photographing mode is set or not, so that when the moving object photographing mode is set, the first division number n is selected and when the moving object photographing mode is not set, the second division number m is selected.

And, the image capturing apparatus and the in-focus position detection method of the embodiments are characterized in that the setting status of the image capturing apparatus is determined based on a number of recording pixels which is set, so that when the number of the storing pixel is less than a value, the first division number n is selected and when the number of the recording pixels is more than or equal to the value, the second division number m is selected.

And, the image capturing apparatus and the in-focus position detection method of the embodiments are characterized in that the setting status of the image capturing apparatus is determined on photographing sensitivity which is set, so that when the photographing sensitivity is more than or equal to a value, the first division number n is selected and when the photographing sensitivity is less than the value, the second division number m is selected.

According to the above-described embodiments, since the camera side determines which subject will be photographed based on the setting status of the camera so as to determine whether to photograph in the high speed AF or to photograph in the high precision AF, high speed AF and high precision AF that are equivalent to those of the single lens reflex camera may be enabled even with a small solid state image capturing element.

INDUSTRIAL APPLICABILITY

A in-focus position detection method according to the present invention is useful when it is applied to, for example, a digital camera, especially a compact digital camera, a camera-installed portable phone, a camera-installed electronic device, and an image capturing apparatus for an endoscope since a high speed and high precision AF performance may be obtained regardless of the status of a subject.

The present application is based on Japanese Patent Application No. 2010-267934 filed on Nov. 30, 2010 and the disclosure thereof is incorporated herein in its entirety by reference.

REFERENCE SIGNS LIST 1x, 1y: phase difference detection pixel
2x, 2y: aperture of phase difference detection pixel
10: image capturing apparatus
20: photographing lens
21: solid state image capturing element
24: driving unit
26: digital signal processing unit
29: system control unit
40: phase difference detection area
I, II, III, IV: divided area

The invention claimed is:

1. An image capturing apparatus comprising:
an image capturing element where pair-pixels each configured by a first phase difference detection pixel and a second phase difference detection pixel that are pupil-divided are arranged two-dimensionally in a phase difference detection area provided on a light receiving surface that captures an image of a subject;
a focus lens that is disposed at the front end of a light path of the image capturing element and forms an optical image which is in-focus on the subject on the light receiving surface; and
a central processing unit (CPU) that calculates a phase difference between a first distribution curve of first detection information output from the first phase difference detection pixel in relation to one side arrangement direction of the pair-pixel and a second distribution curve of second detection information output from the second phase difference detection pixel in relation to the one side arrangement direction and drives and controls the focus lens to the in-focus position based on the phase difference, wherein the central processing unit is further configured to:
determine whether to set a division number into which the phase difference detection area is divided in a direction perpendicular to the detection direction of the phase difference to a first division number n or to a second division number m which is larger than n based on a setting status of the image capturing apparatus,
calculate a correlative operation curve for each divided area by calculating a correlation between the first detection information and the second detection information for each of the divided areas formed by dividing the phase difference detection area into the n or the m, and
acquire a defocus amount to drive and control the focus lens to the in-focus position from a total evaluation curve obtained by conducting a required calculation processing on the correlative operation curves of the plural divided areas,
wherein the setting status of the image capturing apparatus is determined based on a focal length, so that when the focal length is less than or equal to a value, the first division number n is selected and when the focal length is larger than the value, the second division number m is selected.

2. The image capturing apparatus of claim 1, wherein the first division number n includes 1 and the correlative operation curve of the divided area when n=1 is set as the correlative operation curve of the plural divided areas.

3. An in-focus position detection method of an image capturing apparatus that includes an image capturing element where a pair-pixel configured by a first phase difference detection pixel and a second phase difference detection pixel that are pupil-divided is arranged two-dimensionally in a phase difference detection area provided on a light receiving surface that captures an image of a subject; a focus lens that is disposed at the front end of a light path of the image capturing element and forms an optical image which is in-focus on the subject on the light receiving surface; and a control unit that calculates a phase difference between a first distribution curve of first detection information output from the first phase difference detection pixel in relation to one side arrangement direction of the pair-pixel and a second distribution curve of second detection information output from the second phase difference detection pixel in relation to the one side arrangement direction and drives and controls the focus lens to the in-focus position based on the phase difference, wherein the method comprises:
determining whether to set a division number into which the phase difference detection area is divided in a direction perpendicular to the detection direction of the phase difference to a first division number n or to a second division number m which is larger than n based on a setting status of the image capturing apparatus,
calculating a correlative operation curve for each divided area by calculating a correlation between the first detection information and the second detection information for each of the divided areas formed by dividing the phase difference detection area into the n or the m, and
acquiring a defocus amount to drive and control the focus lens to the in-focus position from a total evaluation curve obtained by conducting a required calculation processing on the correlative operation curves of the plural divided areas,
wherein the setting status of the image capturing apparatus is determined based a focal length, so that when the focal length is less than or equal to a value, the first division number n is selected and when the focal length is larger than the value, the second division number m is selected.

4. The in-focus position detection method of the image capturing apparatus of claim 3, wherein the first division number n includes 1 and the correlative operation curve of the divided area when n=1 is set as the correlative operation curve of the plural divided areas.

* * * * *